H. EARL.
Evaporating Pan.
No. 47,401.    Patented Apr. 25, 1865.
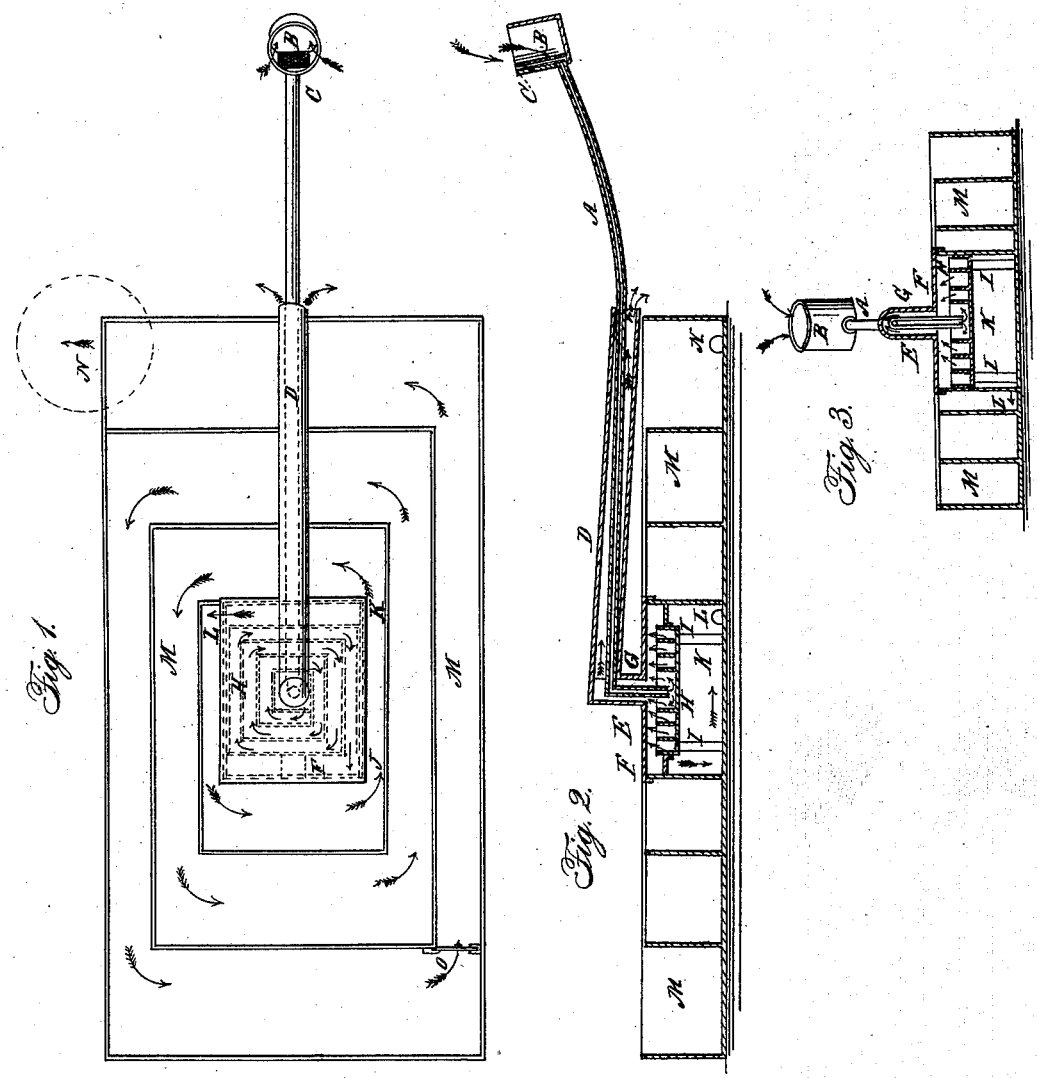

UNITED STATES PATENT OFFICE.

HENRY EARL, OF EDWARDS, NEW YORK.

IMPROVEMENT IN SAP-PANS.

Specification forming part of Letters Patent No. 47,401, dated April 25, 1865.

*To all whom it may concern:*

Be it known that I, HENRY EARL, of Edwards, in the county of St. Lawrence and State of New York, have invented certain Improvements in Sap-Pans, of which the following is a specification.

My invention consists of improvements in the arrangements and fixtures of a sap-pan, by means of which the sap is admitted to the pan in a heated state, and therefore does not check the evaporation, and by means of which the sap as it becomes more condensed passes to the outer and cooler parts of the pan, and, finally, can be drawn off without checking the fire or at all interfering with the process of evaporation.

In the drawings, Figure 1 is a top view of the pan and its attachments, and showing in dotted lines the form and construction of the small movable central pan. Fig. 2 is a vertical longitudinal section through the center of Fig. 1. Fig. 3 is a vertical transverse section through the center of Fig. 1.

A is the feeding-pipe, which receives the sap (through the enlargement B) directly from the receiving-tub.

C is a sieve or screen placed in the enlargement B of the feeding-pipe A, to prevent the passage of any extraneous matter into the feeding-pipe, and thence into the sap-pan.

D is the steam-pipe, through which the feeding-pipe A passes, thus securing the heating of the sap before it reaches the pan. The feeding-pipe A is curved, so as to allow the outer end of the steam-pipe D to be a little lower than the other end, that the drip or condensed steam to fall outside of the pan, instead of being allowed to run back into the pan to be again evaporated. The vertical part E of the steam-pipe D rests upon the cover F of the steam-box, directly over and around the orifice through said cover, into the steam-box. The vertical part G of the feeding-pipe A passes through said orifice in the cover of the steam-box and nearly to the bottom of the movable pan placed in said box.

H is a movable pan placed in the steam-box and resting upon legs I, or supported in any other suitable manner. Said pan H should be enough smaller than the steam-box to allow a free passage for the steam on one or more of its sides between the said pan and the sides of the steam-box, and is so constructed with vertical partitions or division-plates as to furnish a continuous channel for the sap from the place of ingress at the center to the point J, where it flows into the steam-box, as represented in drawings.

K is the steam-box, which is situated over the hottest part of the fire, and into which the sap flows at the point J, and, after passing across the bottom of said box K, escapes by an orifice at the point L into the main pan.

M is the main pan, which is also divided by vertical partitions or division-plates, as represented in the drawings, into a continuous winding channel from the point L, where the sap flows into the said main pan M, to the point N, where the completed sirup is drawn from the pan by means of a stop-cock or faucet placed in the orifice N.

O is a slide or gate, by which the outward passage of the nearly-completed sirup is stopped to allow the completed sirup to be all drawn off, or to prevent the completed sirup from mixing back with the inflowing sap when the fire is allowed to go down at night. It may also serve to regulate the flow of the sap through the winding channel of the pan by being properly adjusted for that purpose. The direction of the steam from the steam-box K to the point where it escapes from the steam-pipe D into the air is indicated by blue arrows, and the direction of the sap from the place of admission, B, to the point N, where the sirup is drawn from the pan M, is indicated by red arrows.

Operation: A sufficient quantity of sap is admitted to cover the entire bottom of the pan to the depth of about two inches. The fire is then started, and when the sap begins to boil a sufficiently large stream of sap is admitted into the pan by a stop-cock, faucet, or other means, to maintain the sap constantly at about the same depth. When the sirup in the outer channel of the pan is sufficiently condensed, it is drawn off by means of the stop-cock in the orifice N, care being taken to so arrange the stop-cocks that the sirup shall be drawn off no faster than the condensation is completed, and that the sap shall be admitted fast enough, and no faster, than to maintain the sap at the same uniform depth of about two inches. The steam that is developed by the evaporation of the sap in the steam-box K is forced to escape by the steam-pipe D, thus heating the inflowing sap and preventing any check to the process of evaporation by the introduction of cold sap to the pan.

Among the advantages of my invention are the following: First, the inflowing sap is heated before it enters the pan, and before it escapes from the movable pan H into the steam-box K it has reached or almost reached the boiling-point; second, the sap is admitted nearly at the center of the pan, directly over the hottest part of the fire, and as the evaporation continues and less heat is required to complete the process, it approaches the outer edges of the pan, where less heat is received, thus proportioning the amount of heat applied to the requirements of the process; third, the sirup may be drawn off as fast as completed; and, fourth, by means of the slide or gate O the sirup may be prevented from mixing back when the fire is allowed to go out.

I claim—

1. The combination of the receiving-pipe A with the steam-pipe D, substantially as and for the purpose set forth.

2. The combination of the movable pan H with the pipes A and D, substantially as and for the purpose set forth.

3. The combination of the steam-box K with the movable pan H, substantially as and for the purpose set forth.

4. The combination of the main pan M with the steam-box K, substantially as and for the purpose set forth.

5. The combination of the slide or gate O with the main pan M, substantially as and for the purpose set forth.

6. The winding arrangement or channeling the pan, by means of which the sap being admitted at the central or hottest part of the pan is conducted to the outer or cooler parts of said pan, substantially as described, and for the purposes set forth.

HENRY EARL.

Witnesses:
L. M. GARDNER, Jr.,
A. S. WHITE.